C. MILLER.
Clover Huller.
No. 13,992.
Patented Dec. 25, 1855.
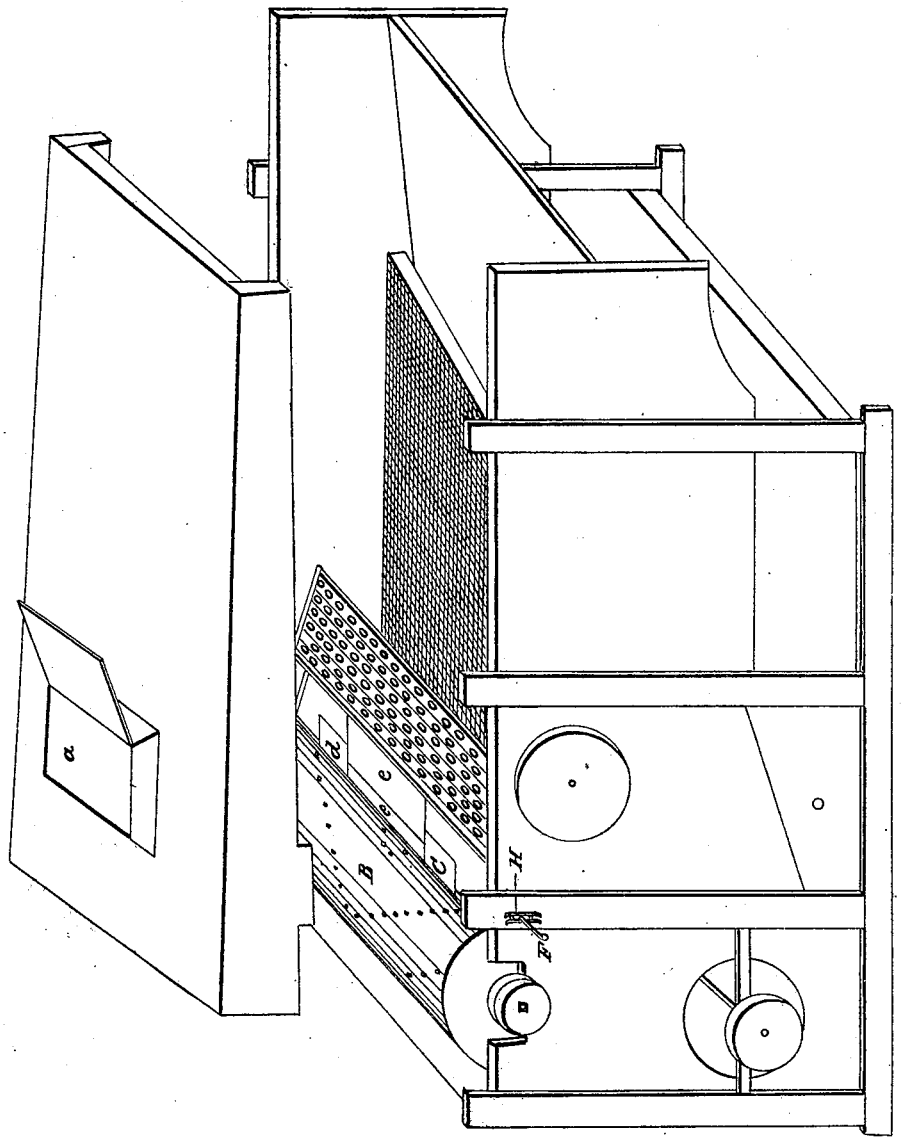
Witnesses:
William Herys.
John Evans.
Inventor:
Charles Miller.

UNITED STATES PATENT OFFICE.

CHARLES MILLER, OF CARROLL, PENNSYLVANIA.

HULLING-MACHINE.

Specification of Letters Patent No. 13,992, dated December 25, 1855.

*To all whom it may concern:*

Be it known that I, CHARLES MILLER, of Carroll township, York county, and State of Pennsylvania, have invented an Improvement in Clover-Seed Hullers; and I do hereby declare that the following is a full and exact description thereof, reference being had to the accompanying drawings and to the letters of reference marked thereon.

The nature of my invention consists in providing any ordinary clover seed huller with a pair of adjusting slides, by means of which the seed can be retained in, or discharged from, the machine at the option of the operator, who can by means of said slides regulate the machine to suit the condition of the seed intended to be hulled and in consequence of which avoid a repetition of running the seed more than once through the machine which is frequently the case in other hullers when the seed is damp.

To enable others skilled in the art to make and use my invention, I will proceed to describe its construction and operation.

I construct my cloverseed huller in any of the known forms, then I apply two adjustable slides $c$, and $d$, to the rear of cylinder B, as shown in the accompanying drawings, which slides I also support by a block $e, e$. By means of which slides I can regulate my cloverseed huller by drawing out said slides toward the sides of the machine, by means of a lever attached thereto as shown at F, when the seed is damp or tough; and when the seed is well seasoned and perfectly dry, I remove said slides by shoving them toward, or to the rear of block $e, e$, by means of the lever aforesaid; consequently it will readily be conceived that by means of said adjustable slides, I can lessen, or enlarge the opening between the cylinder B, and concaves, through which the clover-seed and chaff escape from the huller; thus, for example, when the clover seed is tough, or damp, I can draw said slides toward the sides of the machine, any distance to suit the condition of the seed intended to be hulled, and, the further I draw the same out, the less will become the cavity between the cylinder and concaves for the seed and chaff to escape. The consequence is, that the seed can not escape so freely from the huller, and will in consequence be retained in the huller until it is perfectly hulled before leaving the concaves. After the machine is thus regulated to suit the condition of the seed, I fix said slides stationary by means of a bar drawn on the levers aforesaid as shown at H; when the machine is thus adjusted it will perform the functions required substantially, and does greatly lessen the inconveniences of re- and re-hulling the tailings which are unavoidable in other clover-seed hullers, used independent of the slides and block aforesaid.

What I claim as my invention and desire to secure by Letters Patent is—

The application of the block $e, e$, and adjustable slides $c$, and $d$, by means of which I can regulate the machine so as to retain the seed in the huller until it is perfectly shelled.

CHARLES MILLER.

Witnesses:
WILLIAM HAYES,
JOHN EVANS.